United States Patent
Goggins (10) Patent No.: US 7,576,918 B2
(45) Date of Patent: Aug. 18, 2009

(54) MATRICAL IMAGING METHOD AND APPARATUS

(75) Inventor: Timothy P. Goggins, Nashotah, WI (US)

(73) Assignee: Pixalen, LLC, Nashotah, WI (US)

( * ) Notice: Subject to any disclaimer, the term of this patent is extended or adjusted under 35 U.S.C. 154(b) by 721 days.

(21) Appl. No.: 10/894,910

(22) Filed: Jul. 20, 2004

(65) Prior Publication Data

US 2006/0017979 A1 Jan. 26, 2006

(51) Int. Cl.
*G02B 27/10* (2006.01)

(52) U.S. Cl. .................................................. 359/619

(58) Field of Classification Search ......... 359/618–619; 382/154, 284, 285
See application file for complete search history.

(56) References Cited

U.S. PATENT DOCUMENTS

| | | | |
|---|---|---|---|
| 5,113,213 A | 5/1992 | Sandor et al. | |
| 5,488,451 A | 1/1996 | Goggins | |
| 5,617,178 A | 4/1997 | Goggins | |
| 5,847,808 A | 12/1998 | Goggins | |
| 5,896,230 A | 4/1999 | Goggins | |
| 6,424,467 B1 | 7/2002 | Goggins | |
| 6,490,092 B1 | 12/2002 | Goggins | |
| 6,635,196 B1 | 10/2003 | Goggins | |
| 7,083,340 B2 * | 8/2006 | Goggins | 400/70 |
| 7,333,268 B2 * | 2/2008 | Steenblik et al. | 359/619 |
| 2002/0006217 A1 * | 1/2002 | Rubbert et al. | 382/154 |
| 2003/0016370 A1 | 1/2003 | Goggins | |
| 2004/0136079 A1 | 7/2004 | Goggins | |

FOREIGN PATENT DOCUMENTS

| | | |
|---|---|---|
| EP | 772797 B1 | 5/1997 |
| WO | WO 01/96079 A2 | 12/2001 |

OTHER PUBLICATIONS

Article: "Honeycomb vs Square and Cubic Models", authors: Valentin E. Brimkov and Reneta P. Barneva, Electronic Notes in Theoretical Computer Science 46 (2001), 18 pages.
Article: "History of Lenticular and Related Autostereoscopic Methods", author: David E. Roberts, Leap Technologies (2003), 16 pages.
Article: "Stereoscopic Imaging Technology", author: Michael Starks, 3DTV Corporation, printed from Internet on Mar. 24, 2004, 22 pages.

* cited by examiner

*Primary Examiner*—Alicia M Harrington
(74) *Attorney, Agent, or Firm*—Ryan Kromholz & Manion, S.C.

(57) ABSTRACT

A method of producing a multidimensional image is disclosed. A plurality of planar images is layered in a desired sequence. A matrical image file is formed from the layered planar images and then printed. The resolution of the final matrical image is separate in both the X- and Y-directions, which provides for a high level of resolution for both movement and 3-D effects in the image.

16 Claims, 9 Drawing Sheets

MATRICAL IMAGING METHOD AND APPARATUS

BACKGROUND OF THE INVENTION

The present invention relates to multidimensional imaging and to methods and devices for improving multidimensional imaging. Specifically, the present invention relates to high-resolution multidimensional imaging.

Many recent developments in multidimensional imaging have been directed towards improvements on lenticular imaging. Lenticular imaging generally consists of creating a plurality of frames, ordering the frames in a desired sequence, rasterizing and compressing the frames, converting and interlacing the compressed frames, and transferring the frames to an imaging device and producing an image. The resultant image can give the impression of movement or three-dimensionality. Examples of lenticular imaging processes are described in U.S. Pat. Nos. 5,896,230, 5,847,808, 5,617,178, and 5,488,451, by the same inventor as the present invention, which the disclosures are incorporated herein by reference.

Lenticular imaging uses lenses designed specifically for the lenticular imaging process. The individual lenses or lenticules are arranged in a linear fashion, typically either in a vertical or horizontal arrangement and are typically elongated cylinders extending the entire length or width of the lenticular image. Vertically arranged lenses provide a viewer with a three-dimensional (3-D) image when viewing the image in a left to right manner. Horizontally arranged lens give a perception of movement in the viewed image. While there may be some motion attributes for a vertical arrangement and some 3-D attributes for a horizontal arrangement, the specific vertical or horizontal alignments provide for visual clarity or acuity of the image frames for either 3-D features or movement, respectively, but not for both. The improved sharpness or clarity of a specific visual effect depends on the alignment and direction of the lenses and is possible in only one direction, regardless of the quality of the lens, and, as such, is a limitation of lenticular imaging.

Along with incorporating movement and 3-D aspects into the presented images, advancements in multidimensional imaging have focused on the resolution of the final product. Resolution of the printed lenticular images has been improved by establishing screening techniques that increase the frequency of the dots in the image. For instance, multidimensional imaging has moved from an amplitude modulation based process, such as half-tone screening, that potentially degrades the images and pictures by averaging the pixels within the image, to a frequency modulation based process, such as stochastic screening. Adjusting the focal lengths of the lenticular lenses has improved the visual resolution of the lenticular images, as well. The lens resolution or pitch for high definition lenticular lenses has increased from having 75 lenses per inch, to 100 lenses per inch, to a lens resolution of 200 lenses per inch, disclosed in, U.S. Pat. No. 6,424,467, with the same inventive entity as the present invention and incorporated by reference.

Other imaging processes, such as barrier strip imaging, have been employed in multidimensional imaging. Sandor et al., U.S. Pat. No. 5,113,213, discloses a barrier strip imaging process where a predetermined number of planar images of an object from different viewpoints are interleaved and printed with a selected edge of each interleaved image aligned in a predetermined direction. Barrier strip imaging allows interlaced images to be projected as multidimensional images by backlighting the image and viewing the image through a barrier strip. Barrier strip imaging blocks the view of portions of the interlaced image and prevents the viewer from seeing a graphical image over the majority of the viewable area. The interlaced image is only visible through narrow clear regions located between the barrier strips. Furthermore, barrier strip imaging provides only transmissive multidimensional imaging and generally is inadequate for reflective imaging, which limits the overall utility for barrier strip imaging.

Current technology has developed accordingly to the limits available for computer printing. Current technology has generally been based on, among other factors, pixel limits of computer programs, processing speeds for computer programs, and the amount of storage space on a computer. Graphical hardware and software solutions were both limited by the state of the art. Lenticular lenses and methods were developed according to the industry's graphic imaging standard, preferably using Adobe® Photoshop® software, versions 7.0 and earlier, where the upper available pixel limit was approximately 30,000×30,000 pixels. The upper limit for memory and storage space in operating systems and file systems on a desktop computer was around 2 gigabytes of information. Thus, printing and imaging equipment was designed with such limits in mind.

However, recent advancements have allowed the upper pixel limit to be in the range of 300,000×300,000 pixels or more. With the use of a 64-bit operating systems, such as Mac OS X 10.3.3, developed by Apple Computer, Inc., it is now possible to address and utilize files holding 8 gigabytes of data in RAM, and it is further possible to store files having greater than sixteen (16) terabytes of information, as depicted in Table 1.

TABLE 1

Expansion of Processing Limits

|  | Previous Limit | Current Potential (minimum) |
| --- | --- | --- |
| Pixel Imaging | 30,000 × 30,000 pixels | 300,000 × 300,000 pixels |
| RAM storage | 2 gigabytes | 8 gigabytes |
| File capacity | 2 gigabytes | 16 terabyte |

Adobe® Photoshop CS®, version 8.0, currently is the industry's standard that may also utilize the higher software potentials. Though graphical imaging software has developed to allow operating systems, file systems, RAM and hard drive capacity, and data processing storage to greatly increase multidimensional imaging processes, such as lenticular imaging, which use lenticular lenses, the processes have not developed at a comparable rate to fully take advantage of the improvements of the software. Previous imaging processes, such as lenticular imaging, still are limited by the quality and precision of the lenses, and, also, prior printing methods and printing technology. New methods and devices for utilizing the advances in technology and programming are desired that also will adapt with future technological advancements and improvements.

Prior processes, such as lenticular imaging, also require precise correspondence of interlaced images and the lenticules of the lenticular lens in the final image, to prevent banding of the image. Banding refers to a final multi-dimensional image where each individual frame is not seen completely as a contiguous individual image, resulting in an improper, incomplete final image in its entirety. Correspondence refers to the interlaced segments of the provided images being congruent with the individual lenticules of the lenticular lens. As explained in U.S. Pat. No. 6,490,092, and incorporated herein by reference, without proper correspondence between the image segments and the individual lenticules, degradation of the final image is visibly noticeable. It would be advantageous to have a process that would achieve correspondence in a timely and efficient manner.

Another form of banding may occur when the resolution of the image frames does not properly coincide with the resolution of the output device, which has been addressed in U.S. Pat. Appl. No. 2003/0016370, herein incorporated by reference. This form of banding may be caused in several ways. For example, interpolating of the image pixels, which results in distortion, blending, and degrading of the image frames, or duplicating or truncating pixels, which creates hard glitches, lines, or artifacts, which are visually objectionable repetitive patterns, within the final image. If the resolutions of the interlaced image frame and the output device are not equal, the interlaced image must be interpolated to fit the resolution of the device. If the resolution of the image frames is higher than the resolution of the output device, individual pixels will be truncated providing hard lines in the final image. If the output resolution is higher, the individual pixels will be duplicated, causing pixels of image frames to be repeated in an undesirable pattern in the final image. While interpolating the pixels may achieve correspondence, interpolation may cause degradation of the final image by introducing glitches, lines, and artifacts by averaging data and blending frame information, which can cause ghosting. Imaging methods using fixed resolution devices have been developed to interpolate pixels to achieve proper correspondence between the image frames and the output devices. However, these methods still result in degradation of the final image, such as lines, artifacts, or visually objectionable patterns.

When compositing individual images used for multidimensional imaging processes, such as for lenticular imaging, screening processes, as previously discussed, can be used. Printing methods that require screening, such as lenticular imaging, screen the interlaced image prior to printing. Halftone screening methods that average pixels, and stochastic screening methods, such as error diffusion, pass error to surrounding pixels, thereby passing the error to juxtaposed image frames or by passing errors to the next segment of the compressed image frame, which results in the juxtaposed frames no longer containing clear or clean data. However, interpolating frames, as previously stated, passes errors from one frame to the next resulting in unnecessary blending of image frames, resulting in reduced visual acuity and clarity, whereby ghost images potentially may arise in the juxtaposed frames. Passing errors from one frame segment to another encompasses a distance that is of greater length than desirable, as shown by the arrows in FIG. 1C, potentially blurring the image frames. It would be advantageous to provide a process that would not require errors to be passed over several frames or over a great distance in a composite image.

Lenses developed for multidimensional imaging are limited, as well. While the number of lenses per inch has increased, as previously mentioned with respect to U.S. Pat. No. 6,424,467, the shape of the lenses is limited to essentially elongated cylinders traversing the length or width of the interlaced images. Round lenses, such as fly lenses, have been used, but leave gaps of non-optical areas that do not magnify portions of the interlaced image and are poor quality lenses for projecting a multi-dimensional image. When designing a lens it would be beneficial to maximize the optical surface of a lens while minimizing the non-optical area of the lens. It is desired to provide a lens that will overcome the shortcomings of the prior art and further provide a lens that will provide high visual clarity for multi-dimensional images not previously utilized by the prior art.

SUMMARY OF THE INVENTION

The present invention provides an advancement in multi-dimensional imaging over barrier strip imaging, lenticular imaging and other imaging processes. The present invention provides methods and apparatuses that may be used to provide images that may contain both 3-D visuals and motion together in the same image, with a high level of visual acuity and clarity for both. Motion has progressed from a linear progression to a matrical progression, whereby image progression may move from a variety of tangential progressions within the single, final image. By allowing an image to have 3-D perception at multiple points in time, increase motion within an image, or allowing dimensional views from more than one horizontal plane in the same image, the present invention exponentially increases the level of dimensionality and visual effects of the imaging process not previously realized.

Lenticular imaging was an improvement over conventional two-dimensional printing and imaging by compressing and interlacing a number of frames into the same space as that of the conventional 2-D image. For instance, it has been useful for the lenticular imaging process to compress 12 frames into the space of a single image. Using 12 frames is not a limit on the maximum number of frames and is also not currently a limit on the number of frames for the present invention, but since multi-dimensional imaging is carried out best with a whole number of frames, or whole number factors of that number of frames (i.e. 2, 3, 4, or 6), interlacing of 12 frames is a useful number of frames to use in an imaging process. Because certain visual effects of an image may be repeated within a frame or certain effects may be divided evenly over an image, a multiple divisible number of frames, such as 12, is a good candidate as a base number of frames. For instance, 13 frames, though a higher number of frames than 12, limits potential image designs, since effects may not be properly and evenly distributed through the frames, since 13 is a prime number.

Lenticular imaging, animation, motion or movement over time normally interferes or conflicts with 3-D imaging in a lenticular process, which limits high visual acuity to either motion or 3-D features. The present invention, known as matrical imaging, allows for images to be arranged within an x-y matrix. It is possible to have different 3-D sets from different points of time in the same image space as that of the original, conventional 2-D image. In the same space where a single conventional image was increased to a 12 frame image containing movement or 3-D effect with lenticular imaging, the present invention enables 12 frames×12 frames, or 144 possible frames, to be viewed in the same area, potentially containing both 3-D effects and movement and other special effects. Thus, given an imaging resolution for lenticular imaging comprising a certain number of frames, f, matrical imaging allows for a potential exponential increase in the number of frames, $f^2$, having the same image resolution as with lenticular imaging having f frames. With an exponential increase in the number of images, the ability to provide motion also increases. It will be possible to have 3-D images that will also include motion at a high visual acuity and clarity, have several sets of 3-D images from different points in time, or have completely different sets of 3-D images within the same matrical image. Matrical imaging allows for an exponential increase in the image possibilities and enables new imaging effects that were previously unattainable by prior imaging methods. Matrical imaging should be defined as a multi-dimensional imaging process that provides for a high visual acuity of arranged image frames that may contain several visual effects, such as three-dimensionality, movement, movement over time, and other visual special effects, all within a single final image, in more than one linear direction within the image, with or without the use of a lens.

While lenticular imaging provides a linear viewing of sequential frames, matrical imaging provides for viewing a sequence of a tangential continuum of images. It is possible to view several parallel, perpendicular, or tangential sequences within the same matrical image. Lenticular imaging is limited to the viewing of a linear sequence. Matrical imaging, however, allows viewing of images that are left and right, up and down, and diagonally bordering a specified image, all within the same matrical image. The different viewable scenarios are exponentially greater than the limited scenarios of a lenticular image.

Another advantage over the prior art is that matrical imaging may be used with or without lenses. When lenses are used, the lenses form a matrix, in contrast to previous imaging processes that aligned lenses in only a linear direction. Furthermore, if lenses are used, they are not limited to cylinders that run the length or width of the image, but could be any reproducible shape, preferably a polygon, such as a square, rectangle, hexagon or honeycomb shape. A matrical lens is a lens that is used in connection with a multi-dimensional image that allows accentuation of special visual effects in multiple linear directions within a single lens. The most advantageous arrangement of the lenses would be a tiled or tessellated arrangement. A tessellated arrangement refers to a lens pattern of repetitive lenses, preferably symmetrically shaped, that covers the image area, wherein each of the individual lenses do not extend the entire length or width of the image area, but rather the repetitive pattern of the lenses extends in at least two directions.

With matrical imaging, the individual image frames are assembled in a desired order to form a matrical frame set. The matrical frame set is a series of planar frame images, which can be combined to form a matrical image. A matrical lens or lens array and an alpha matrix are chosen and applied to the matrical frame set. The matrical frame set is saved as a matrical image file and the resulting composite image may be outputted to a desired device.

Generally, the steps of forming a matrical image comprise:
providing a plurality of planar image frames;
ordering the planar image frames into a matrical frame set to form a matrical sequence;
selecting a matrical lens;
designing an alpha matrix that corresponds to the matrical sequence and the matrical lens;
applying the alpha matrix to the matrical frame set;
forming a composite matrical image file from the matrical frame set; and
outputting the composite matrical image file to form a matrical image.

As stated, matrical imaging may also be accomplished without the use of lenses. Current computer software, such as Adobe® Photoshop CS®, manufactured by Adobe Systems Inc. of San Jose, Calif., can be incorporated to produce matrical images which do not require lenses, and, also, produce lenticular-style images without requiring lenticular lenses. Along with the images, an alpha matrix is designed that will allow a person to view the layered images through the alpha matrix in a predetermined arrangement. Images are layered upon one another to form a single image, with a corresponding alpha matrix arranged over the images. The alpha matrix forms an image that is applied to a substrate. The composite image is adjoined to the reverse side of the alpha matrix image, which provides for the final matrical image.

The process generally comprises the steps of:
providing a plurality of planar image frames;
designing an alpha matrix;
applying the alpha matrix to a surface image to form an alpha matrix image;
ordering the planar image frames into a matrical frame set to form a matrical sequence;
outputting the alpha matrix image;
joining the alpha matrix image to a front surface of a clear substrate;
forming a composite matrical image file from the matrical frame set;
outputting the composite matrical image; and
jointing the composite matrical image onto the clear substrate on the surface of the substrate opposite of the front surface.

The alpha matrix is being used in two separate ways for the lensless matrical imaging process. It provides a surface image for the final matrical image and also allows a viewer to view the embedded composite image with the perceived special effects.

The resultant matrical image and file containing the matrical image, besides potentially providing a high visual acuity, has advantages over prior methods by not interpolating the image frames. The process eliminates degradation of the image frames by not interpolating the frames as is necessary in lenticular imaging methods. The images do not have to be scaled, distorted, and rerasterized to a new resolution, either. Using current software allows the independent layers to be maintained as vector and/or raster art, which provides added flexibility when editing or correcting a matrical image. It is possible with the present invention to screen the images without the need to average pixels. Errors are not passed out over multiple individual frames and it is no longer necessary to average juxtaposed frames, as with lenticular imaging. The planar images of frames do not need to be designed at an intermediate size and "res'd", compressed, and interlaced to form a composite image.

Matrical image frames may be designed directly at the size and resolution required for the final matrical image. All of the original data of the individual image frames is retained within the layered matrical image, resulting in higher accuracy, visual acuity and clarity over previous methods. The matrical image file has a dynamic quality, as well, that allows the image to be edited, without recreating the entire composite matrical image file or frame set. Further, the steps of compressing, interlacing, and storing the compressed file are avoided with the present method.

Matrical imaging potentially uses a different screening process than previously used in lenticular imaging, but may also use the same screening processes as used for lenticular imaging, such as halftone screening methods and stochastic screening methods. However, matrical imaging methods using these previously known screening methods screen the images in a different way and at different times than lenticular imaging, thereby removing errors associated with screening during a lenticular imaging process. The screened images in the matrical process are complete, whole, uncompressed, and are not interlaced, thereby eliminating errors arising in the lenticular imaging screening process, as previously discussed. The screening process of this invention allows for each individual frame to be screened, which eliminates the passing of error to adjacent frames and eliminates the degradation of juxtaposed frames caused by screening related to the previously interlaced images. The matrical imaging method requires processing a larger amount of data than previously processed. However, as previously stated, operating systems, such as OS X 10.3.3, have progressed that makes this process viable. The result is high image clarity, having smoother tones and a less grainy/noisy appearance.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Matrical imaging is an improvement over previous imaging processes because of the potential for an exponential increase of visual effects according to a simplified process. Matrical imaging may or may not use lenses when producing matrical images. For example, a computer video editing software program, such as Adobe® After Effects®, manufactured by Adobe Systems Inc. of San Jose, Calif., would be used for preparing a matrical image. The frames could be kept in a workable state or "a project" for editing purposes, which would allow the adding of more special effects, graphics, elements, images, and parallax effects during the editing process. The images could then be rendered into another computer software program, such as Adobe® Photoshop CS®, for final preparation before printing the matrical image. Other software programs could be employed in the imaging process and it should be understood that the process is not limited to a specific software program.

Matrical imaging layers and/or arranges the different image frames upon each other for the final matrical image. Whereas lenticular imaging segmented, compressed, and interlaced the images, the process according to the present invention forms a layered alpha matrix, which corresponds to the matrical lens array or sequence, to create the composite matrical image. This is an improvement over the prior art because it allows all of the information from the individual frame layers to remain fully intact, which gives a fluid dynamic to the matrical image. Since all of the individual frame data is present, editing of the final image does not require the user to go back to a previous intermediate work file. The frames have not been scaled, compressed, or interpolated to new resolutions, so the data in the final matrical image is the same data as in the original individual image files and editing may occur directly from the final matrical image file. Though all of the data may not necessarily be viewed in the final matrical image, the data can nonetheless be present in the composite matrical image file. The composite matrical image file should be referred to broadly to encompass any intermediate image file used for forming a matrical image, between the individual frames and the eventual matrical image.

Figure 1A:
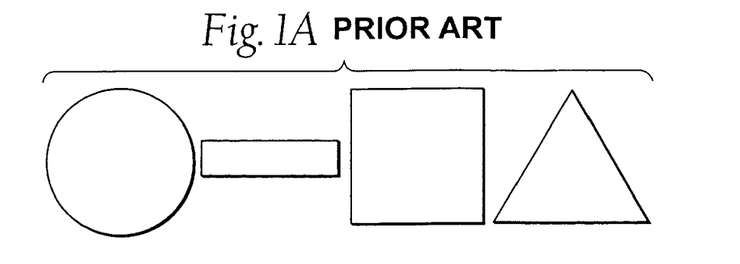
FIGS. 1A-1D are diagrammatic representations of a multidimensional imaging process according to the prior art.
Figure 1B:
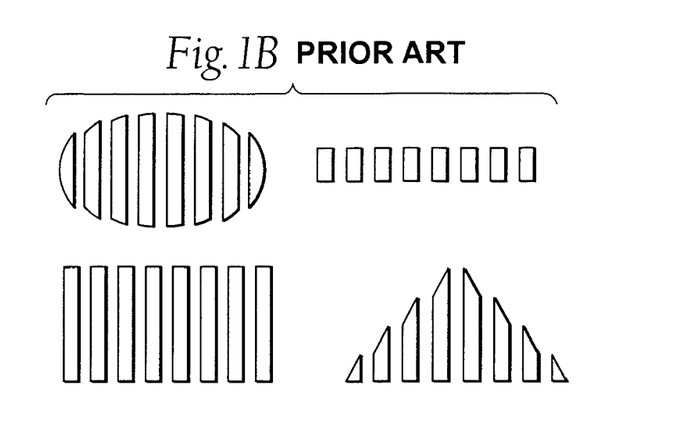
Figure 1C:
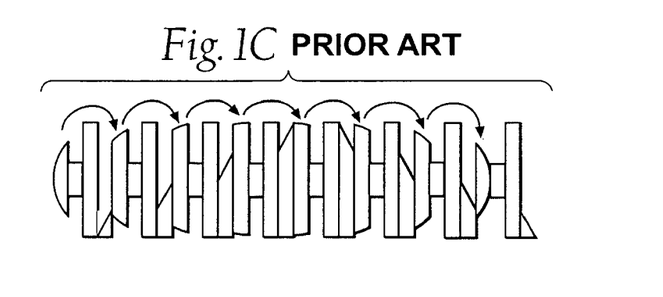
Figure 1D:
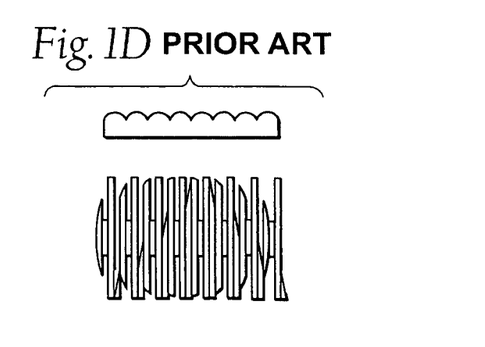

FIGS. 1A-1D are diagrammatic views of the prior art process of lenticular imaging. As an example, four planar shapes are shown. The shapes are segmented (FIG. 1B) and then ordered (FIG. 1C). The shapes are then compressed (FIG. 1D), the resolution is brought to the desired level, and a lenticular lens is applied to the process.

Figure 2:
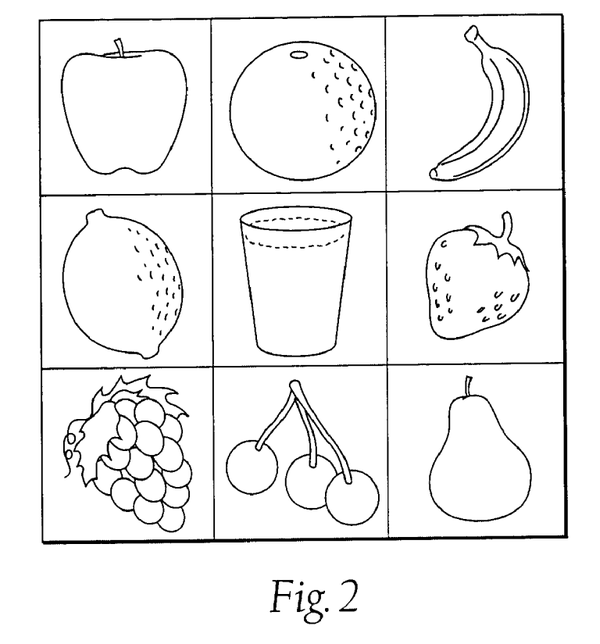
FIG. 2 is a diagrammatic view of a potential matrical frame set arranged in an array according to the present invention.

FIG. 2 shows a diagrammatic view of the present art process. A set of nine planar image frames is shown depicting various fruits and a central hero image frame of a glass of juice, arranged in a 3×3 matrix. A hero frame can be considered the resultant frame for a particular image sequence. The planar images are preferably digital images, which can consist of text, photographs, logos, graphics, pictures, or any other planar designs that would be combined together for a final matrical image. The planar images are individual frames and may be arranged and rearranged in any desired order.

Figure 3:
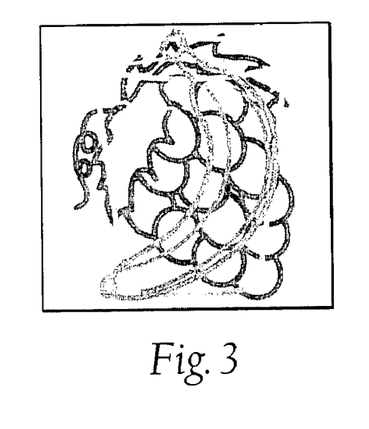
FIG. 3 is a diagrammatic view of individual image frames used in the matrical frame set of FIG. 2 overlayed to form a matrical image.

After choosing the image frames, the frames are ordered in a matrical sequence. For instance, as shown in FIG. 2, the 3×3 matrix would be one possible arrangement of the image frames. Because the frames are not interlaced, the order of the frames may be changed without needing to reconstruct the images. The frames may then be layered upon one another, as shown in FIG. 3, to form a composite frame set. For simplicity and clarity, only three of the image frames are shown layered. It is understood that all of the image frames would be included in the composite frame set. The composite frame set may be saved as a composite matrical image file, which may be edited as necessary without needing to recreate the frames, since all of the data of the frames will be available within the composite image file.

The present process removes the steps of segmenting, compressing, and interlacing the images, which allows all of the data in the original frames to be available for use in the final matrical image. All of the data will not necessarily be viewable in the final image, but the information will not be lost to degradation, as in previous imaging processes. Furthermore, because the data of the individual images is retained in the matrical image file, the matrical file has dynamic and fluid properties that allow the file to be changed and adapted without needing to recreate a compressed file or interlaced file, as with lenticular imaging. It should be also noted that the number of frames in one direction is independent of the number of frames in the other direction. For instance, a matrical image may have 12 frames in the X-direction and perhaps 24 in the Y-direction, if desired. The independence in each direction allows the matrical image to be tailored for specific situations and allows for individual integer frames in both directions that can be independently "res'd".

Figure 2A:
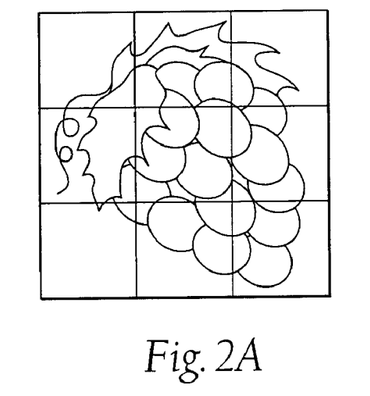
FIG. 2A is a diagrammatic view of an individual image frame used in the matrical frame set of FIG. 2.
Figures 4, 4A, 5:
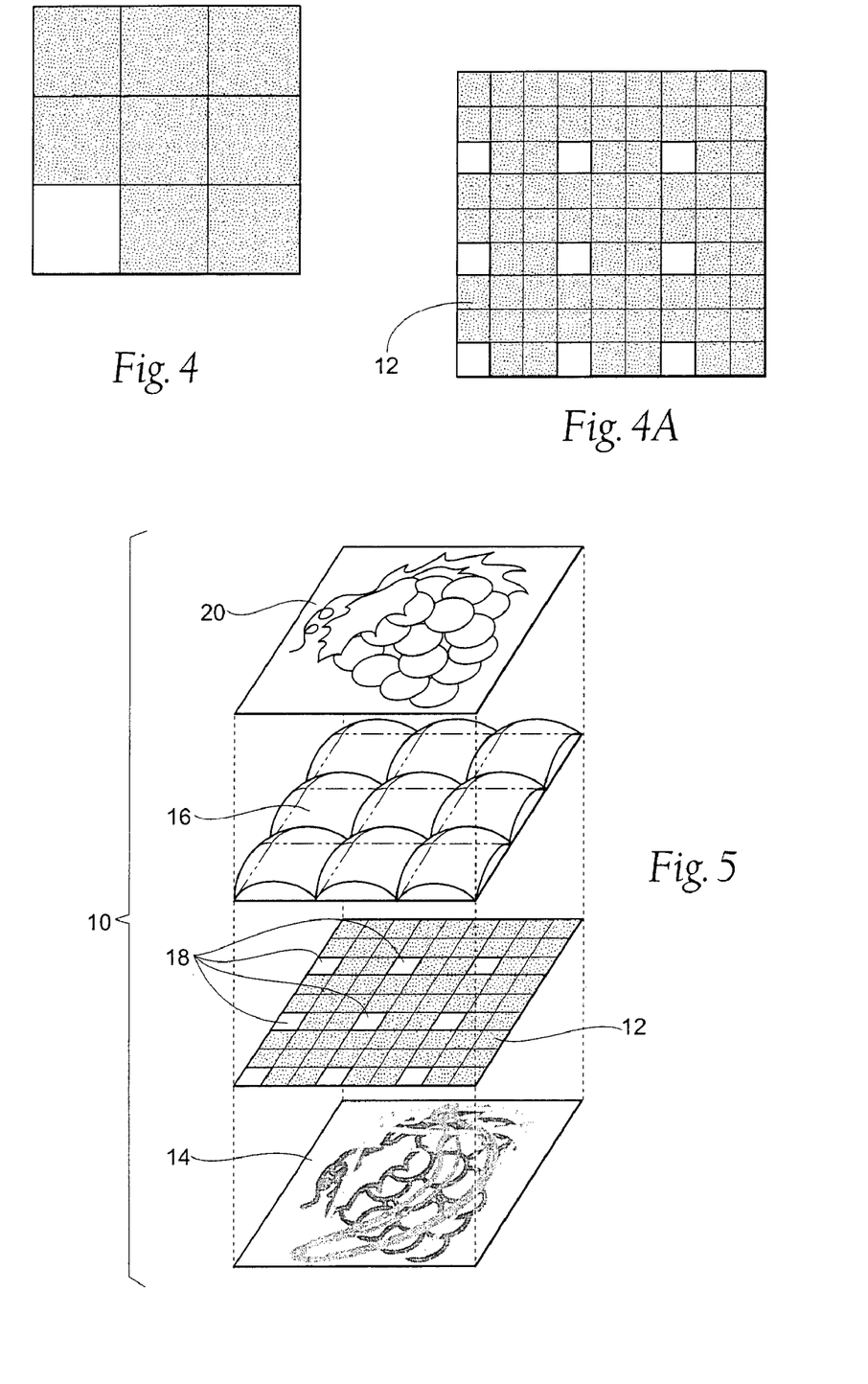
FIG. 4 is a diagrammatic view of a portion of an alpha matrix designed according to the present invention.
FIG. 4A is a further view of an alpha matrix using the portion shown in FIG. 5
FIG. 5 is an exploded view of an alpha matrix and image designed according to the present invention.

An alpha matrix is formed to correspond to the desired matrical sequence. For instance, a possible alpha matrix 12 is shown in FIGS. 4 and 4A, which would correspond to the bunch of grapes image frame (see FIG. 2A) (bottom left corner) of the matrix array shown in FIG. 2. The alpha matrix provides a viewing aperture of a specified section of the composite frame set when viewed from a specific angle. The alpha matrix is formed independently of the matrix array and may be formed before or after ordering the matrix array sequence.

FIG. 5 shows an exploded view of a matrical image 10 using the alpha matrix 12 shown in FIG. 4A. The alpha matrix 12 is applied to a composite matrical image set 14. A matrical lens or lens array 16 is applied over the alpha matrix 12 and the composite matrical image set 14. When the image 10 is viewed at the correct angle through apertures 18, the viewer will perceive the image of the bunch of grapes 20.

Figures 6, 7:
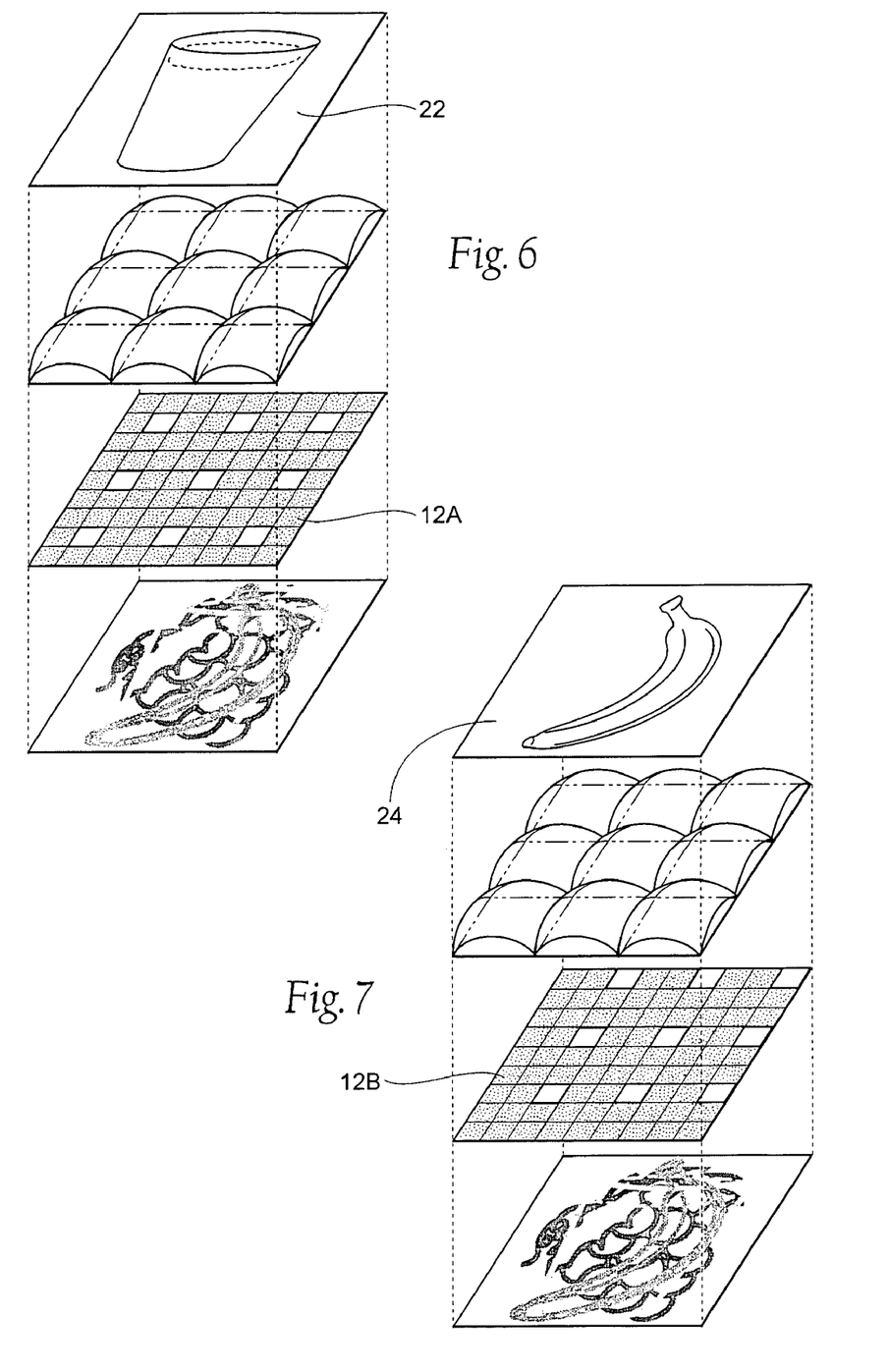
FIG. 6 is a further exploded view of an alpha matrix and image designed according to the present invention.
FIG. 7 is another exploded view of an alpha matrix and image designed according to the present invention.

FIG. 6 shows an exploded view of the matrical image 10 being viewed from a different angle as that of FIG. 5. Now, the composite matrical image set 14 is being viewed through an alpha matrix 15A, which corresponds to the center image (FIG. 2) of a glass 20. This allows the viewer to perceive the image of the glass 20.

FIG. 7 shows a further exploded view of the matrical image 10 being viewed through an alpha matrix 15B, which corresponds to the upper left image (FIG. 2) of a banana 24. When looking at the matrical image 10 at the proper angle through the apertures 18 located in the alpha matrix 15B, the viewer will see the banana 24. As shown in FIGS. 5-7, any of the individual images of the matrical image 10 will be clearly seen, depending on the viewing angle.

Figure 8:
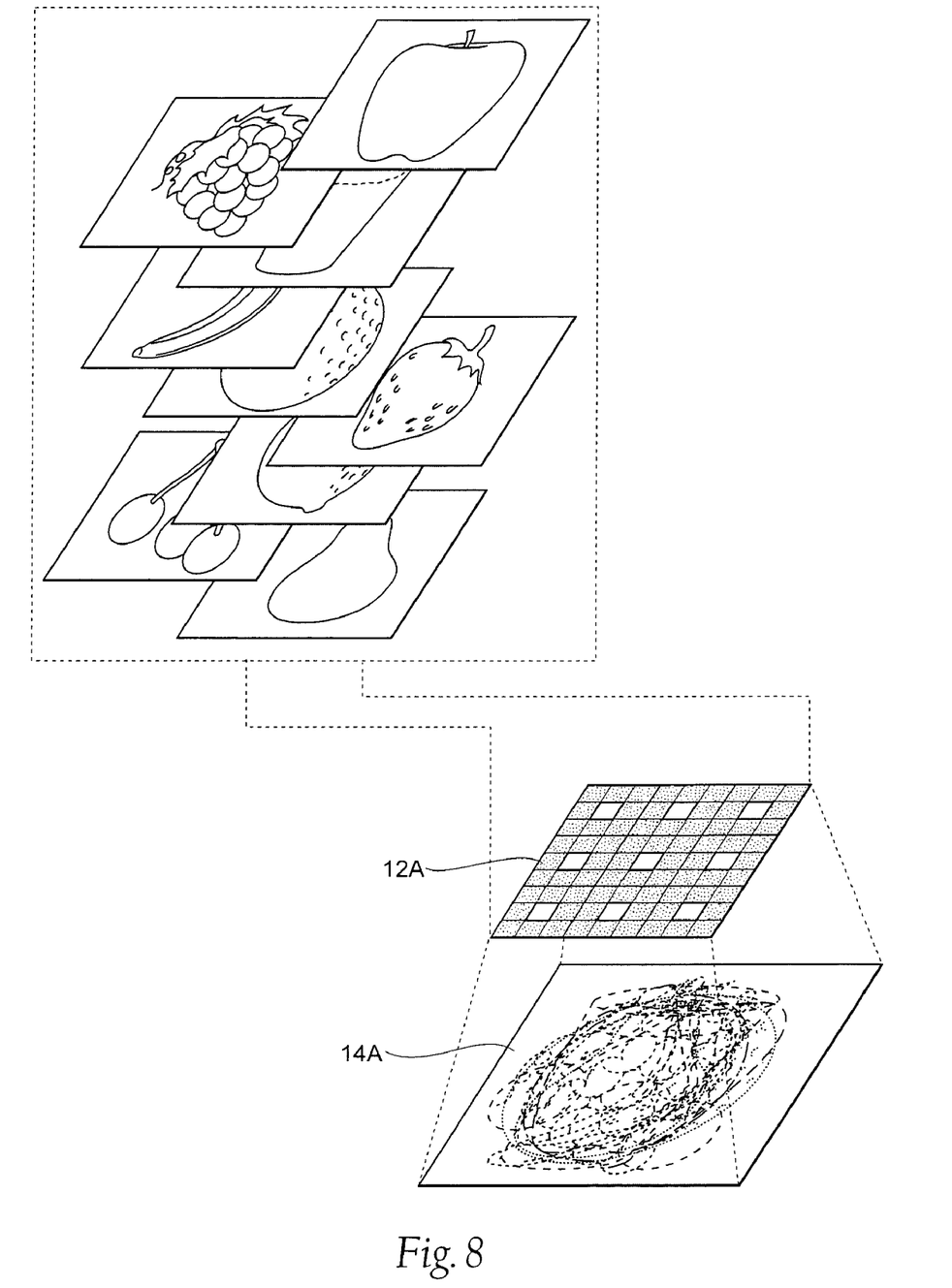
FIG. 8 is a diagrammatic arrangement of an alpha matrix and image set according to the present invention.

While each of the image frames is aligned with a corresponding alpha matrix, in reality only one alpha matrix needs to be designed. As shown in FIG. 8, an alpha matrix 15A is designed. Then, through the use of a computer or computer program, the alpha matrix 15A may be manipulated to correspond to each of the individual images to produce the composite matrical image set 14a, which shows all of the images overlayed. The designed alpha matrix can be replicated and applied to each individual frame image. Depending on the arrangement of the matrical sequence, the position of the viewing aperture is moved and adjusted to correspond to another image frame. Correct positioning of the alpha matrix for each frame will provide a properly viewed composite image.

Thus, three general ways of applying the alpha matrix will be suitable for the present invention: An individual alpha matrix could be designed for each individual frame and applied accordingly; an alpha matrix could be designed for all the frames, which would be moved and adjusted to correspond to each of the images; and, an alpha matrix could be designed, and a computer or computer program would be employed to configure each of the images to the alpha matrix. Any of these processes or similar processes may be utilized in the matrical process.

FIG. 8 also shows that each of the images is an individual image. This is a significant advantage over previous processes, since the order of the images may be arranged and rearranged as desired. Even after the images are arranged in a certain order, it will still be possible to move them around, since the data from the images is still present. A new, intermediate file does not need to be designed, as with previous processes.

Along with selecting an alpha matrix, a matrical lens is designed for the matrical image. Examples of lenses and lens arrangements are shown in FIGS. 10-13. As previously stated, the lenses preferably consist of reproducible, symmetrical shapes and comprise a tessellated arrangement. A plurality of lenses will be arranged in a matrix to cover the area of the matrical image. It should be understood that unless referring specifically to an individual lens or an array of lenses, the term matrical lens will refer to both individual lenses and lens arrays. The shape of the lenses may cover a wide range of shapes, such as a square shape (FIGS. 10 and 11), a hexagonal shape (FIG. 12), a rectangular shape (FIG. 13), or any other desired geometrical shape. As should be further appreciated with lenses designed according to the present invention, the lenses do not extend the entire length or width of the final image, as is necessary for lenticular imaging, which contributes to the enhanced capability of the matrical imaging process to provide the effects noted above.

Figures 9, 10, 11, 12:
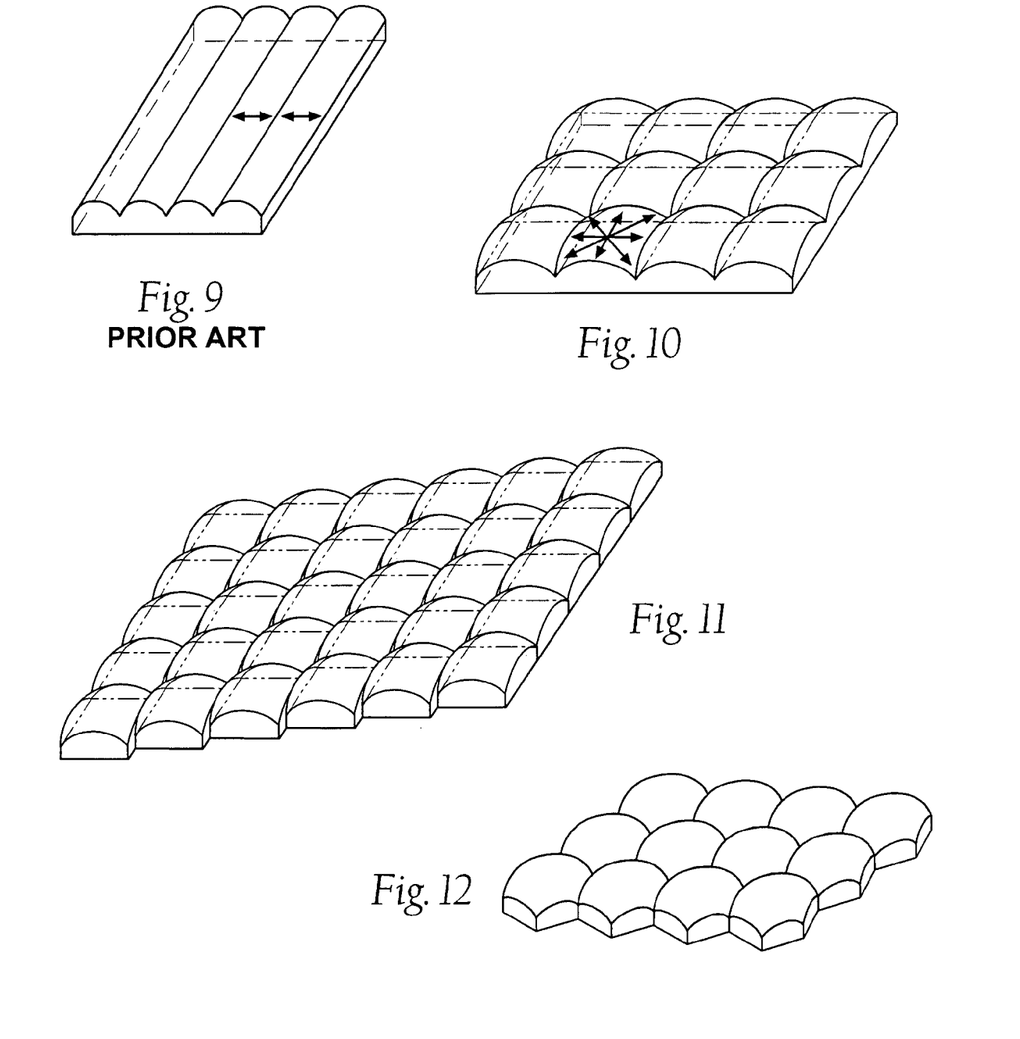
FIG. 9 is a lens arrangement according to the prior art.
FIG. 10 is a lens arrangement according to the present invention.
FIG. 11 is another lens arrangement according to the present invention.
FIG. 12 is a further lens arrangement according to the present invention.

When comparing the prior art of FIG. 9 to FIG. 10, the increase in the number of lenses is evident. This results in a significant increase in the number of lenses. Prior art allowed for 200 lenses per linear inch. Now however, since lenses may lie in both an X- and Y-direction at the same time, the matrical resolution of an equivalent square grid would achieve $200^2$ or 40000 lenses per square inch. It should be understood that although a matrical lens is perceived as containing two axes, the optical properties of the lens may be in any direction of the surface of the lens, as portrayed in FIG. 10.

Figure 13:
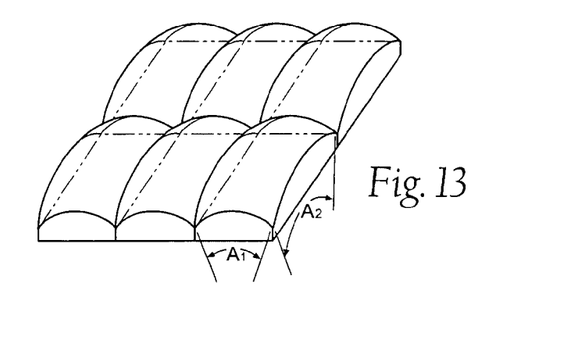
FIG. 13 is yet another lens arrangement according to the present invention.

As a further improvement over previous lens designs, FIG. 13 portrays an array of lenses having a rectangular shape. The lens may have a first arc angle, $A_1$, for one axis of the lens, and a second arc angle, $A_2$, for the other axis of the lens. The anamorphic arc angles allow for different special visual effects to be well perceived in the same matrical image. For instance, a narrower arc angle, such as 60°, is preferred for showing 3-D effects within an image, while a wider arc angle, such as 120°, is preferred for showing motion or other special effects within an image. Thus, if angle $A_1$ was at 60° and angle $A_2$ was at 120°, 3-D morphing could be well perceived in one direction of the image, and motion could be well perceived in the other direction. This is not possible with lenticular lenses, as they are linear and allow only for arc angles with optical properties in one direction. The noted arc angles are merely exemplary, and the angles may be of any size or shape as desired for specific visual effects.

Once the alpha matrix is designed and the matrical lens is selected, the alpha matrix is applied to the matrical frame set to create a composite matrical image. The lens and the matrical array will be adjusted for proper positioning so that resolution correspondence will be achieved. Alignment will vary depending on the shape of the lens. For instance, in a square lens, the alignment will be the same in the X- and Y-directions, but the X- and Y-alignment individually will be different for a hexagonal-shaped lens, or rectangular lens. Furthermore, matrical imaging may be used with a device where the resolution of the lens and the output device do not necessarily coincide. The lens array may be shifted, if necessary. Thus, potential banding problems, discussed previously, would be mitigated, and, the appearance of the bands would be lessened.

The frames will also be screened. As suggested, halftone and stochastic screening methods may be used with the present invention. These methods are typically done in the raster imaging processor ("RIP"), or by drivers, prior to outputting. However, as described in U.S. Pat. No. 5,488,451, it is also known to screen data or an image before sending a file to an output device. This prescreening method works well with the present invention, since each of the whole, uncompressed, image frames may be stored and screened individually. The advantages of processes, such as stochastic screening are present, while preventing the problems previously discussed with stochastic screening and lenticular images.

The resulting matrical image file may then be outputted as a matrical image. The matrical image may be outputted to an inkjet printer, a digital press, or imaged to a plate and printed via a lithographic sheet, a web-based arrangement, a gravure cylinder or a flexo cylinder or plate. Likewise, other types of printers may also be used in connection with the present invention.

Figure 14A:
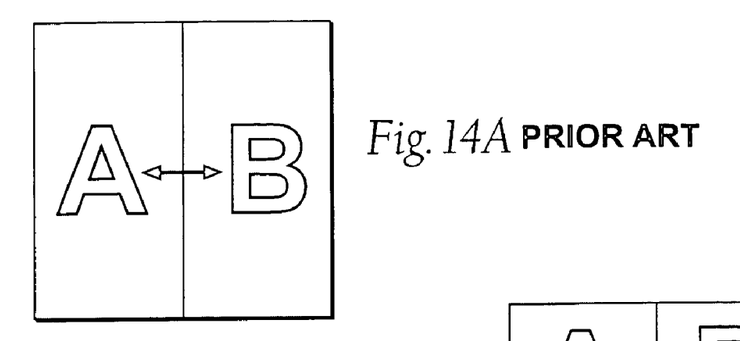
FIG. 14A is a diagrammatic view of an image arrangement according to the prior art.
Figure 14B:
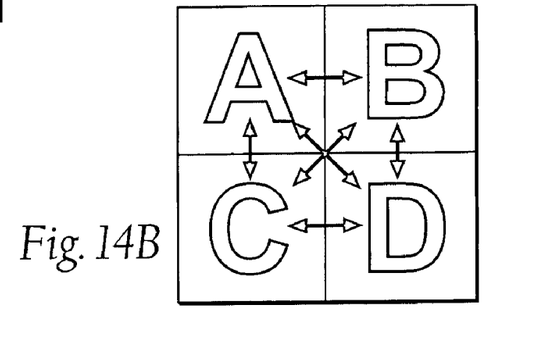
FIG. 14B is a diagrammatic view of an image arrangement according to the present invention and encompassing the same image area as the arrangement of FIG. 14A.

To further emphasize, the flexibility of the present invention, FIGS. 14A, 14B, 15A, and 15B, compare the current invention to the prior art. FIGS. 14A and 14B compare a lenticular image and a matrical image of the same size. FIG. 14A depicts a lenticular image where two images, A and B, will be interlaced within the same final image. The image will have movement from A to B or B to A, or possibly having A and B able to morph into one another. FIG. 14B depicts a matrical image of the same dimensions as that of the lenticular image in FIG. 14A. The matrical image allows two images in two directions to be viewed in the same final image. Four images, A, B, C and D, are viewable in the same sized image as the previous two images of the lenticular image. The image may have movement or morph, from one of the images to any one of the other images. Table 2 provides a comparison of the two imaging process.

TABLE 2

Lenticular Imaging v. Matrical Imaging Possibilities Within the Same Image Area

| Type of Imaging | Number of Individual Frames | Possible sequences |
| --- | --- | --- |
| Lenticular | A, B | AB, BA |
| Matrical | A, B, C, D | AB, AC, AD, BC, BD, DC, BA, CA, . . . ABC, ABD, ADB, BAD, BCD, DAC, DCB, . . . ABCD, ADCB, ACBD, . . . |

Figure 15A:
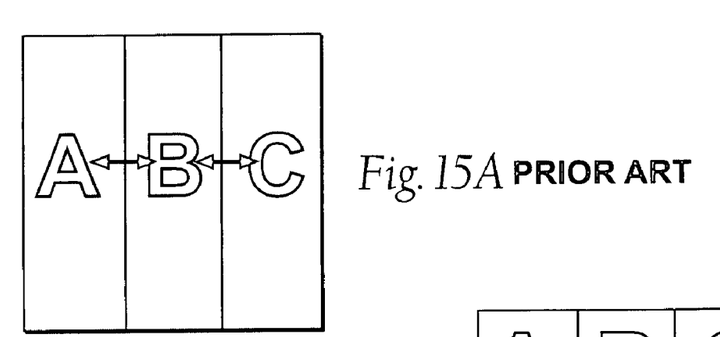
FIG. 15A is a diagrammatic view of an image arrangement according to the prior art.
Figure 15B:
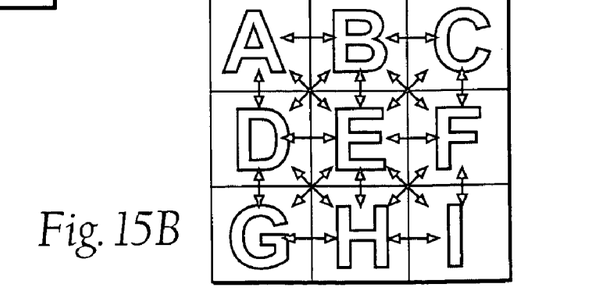
FIG. 15B is a diagrammatic view of an image arrangement according to the present invention and encompassing the same image area as the arrangement of FIG. 15A.

FIGS. 15A and 15B further show the advantages of the present invention. FIG. 15A shows three images, A, B, and C, linearly aligned for a lenticular image. The images may move or morph left to right from A to B to C, or right to left from C to B to A. FIG. 14B exemplifies a matrical image of the same size as the lenticular image in FIG. 15B. The matrical image allows three images in two directions to be viewed, or nine total images, A, B, C, D, E, F, G, H, and I. The images may show movement or morph from any image to any other bordering image. For instance, movement or morphing could happen in a pinwheel arrangement, from A to B to C to F to I to H to G to D to E. Movement or morphing could also happen with all the images ending up at the same hero image. For example, all of the outside images (A, B, C, D, F, G, H, and I) may be fruit that would morph into a glass of juice in the central image (E) (see FIG. 2). A comparison of the two processes is shown in Table 3.

TABLE 2

Lenticular Imaging v. Matrical Imaging Possibilities Within the Same Image Area

| Type of Imaging | Number of Individual Frames | Possible sequences |
| --- | --- | --- |
| Lenticular | A, B, C | AB, BC, BA, CB, ABC, CBA |
| Matrical | A, B, C, D, E, F, G, H, I | AB, AD, AE, BD, BE, BC, BF, EA, EB, ED, EC, EF, EG, EH, EI, . . . ABC, DEF, GHI, AEI, GEC, BEH, FED, DHF . . . , ABCE, ADBE, ADHF, GEIF, FHDB, . . . , AEIFC, ABCED, ADGHI, ADHFE, IECBA, . . . , ABCFIH, ADGHEB, BEDHIF, GDEHIF, . . . ABCFEDG, ADGHEBC, FIEHCDA, . . . ABCEDGHI, ADGEBCFH, . . . ABCFIGHDE, ABCFEDGHI, ADGHEBCFI, ADGHFBCEI . . . |

The tangential continuum of image frames within the matrical image provides a vast number of arrangements of the images. As noted, lenticular imaging corresponds to linear editing, or editing and arranging a linear sequence of images, typically in an up-and-down or side-to-side fashion. Regardless of what direction the linear sequence lies, it is possible to edit the sequence in one direction, but not both. Matrical imaging corresponds to matrical editing, or a process that allows editing and arranging images within a matrical sequence that may be up and down and side-to-side, and diagonally bordering an image, all within the same matrical image.

If the number of images is increased, the different possibilities in a matrical image are increased exponentially over the same-sized lenticular image. Essentially, the possibilities are seemingly limitless for an image containing 12×12 individual images, or possibly more images, such as 24×24 images. Matrical image designs are no longer limited by the linear editing process or the lenticular lens, but rather on the creative ideas of the illustrator or designer.

Through the use of matrical imaging, motion and special effects may be combined within a single matrical image. For instance, in one matrical image, a person may be able to view a 3-D batter swinging at a baseball. By changing the angle of the image, a viewer may be able to view a 3-D image of a pitcher delivering the baseball to the same batter. Another array may allow the same scene to be portrayed from the perspective of the catcher. Because of the matrical image, each of these arrays is possible within the same image, with a high level of visual clarity and acuity for each separate array.

When imaging plates using a "computer-to-plate" (CTP) system on a plate setter, such as the setters manufactured by Creo Inc., located in Burnaby, British Columbia, were used in previous imaging and printing processes, typically the plates are imaged at a fixed resolution and the output resolution is fixed at the same resolution. While it is known that the X- and Y-resolutions may be independently fixed, as discussed in U.S. Pat. Appl. No. 2003/0016370, and may vary independently. However, this is still limited as a linear process, as it was not possible to have independent and varied resolutions that included independent data in both the X- and Y-directions. The present invention provides an improved matrical process over this linear process, by allowing independent and varied resolution in both the X- and Y-directions that contains independent information for the resolution in both directions. This leads to higher independent clarity and acuity, by allowing both the X- and Y-directions to contain independent frame information.

Regardless of the shape of the lenses, the resolution in both the X- and Y-directions may be high since the resolution in each direction is independent from the resolution in the other direction. In lenticular imaging, the images were rasterized and then compressed where compression=1/f, where f=the number of frames and the final image had a ratio of image pixel to output of 1:1. Because matrical imaging does not require compressing of the frames and does not require interpolation to achieve frame resolution, and, furthermore, does not necessarily require the use of lenses, improved multi-dimensional features will be utilized in a more straightforward process.

Figure 17:
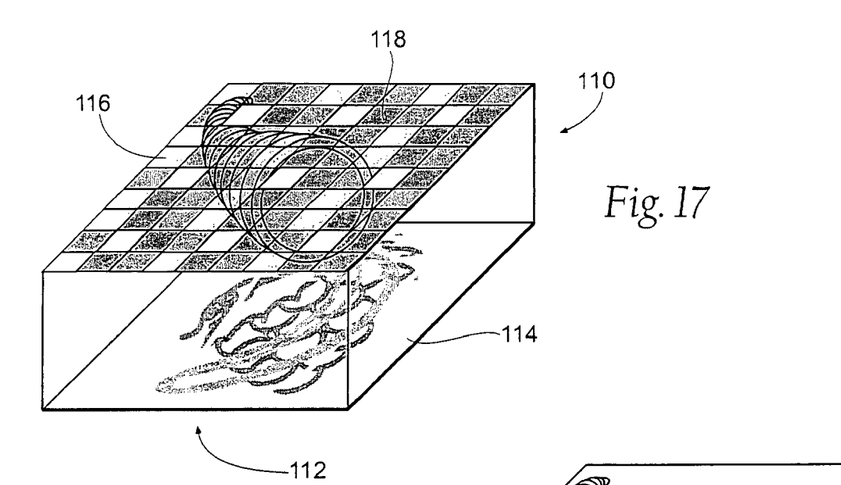
FIG. 17 is a perspective view of a matrical substrate according to the present invention used in a lensless matrical imaging process.
Figure 18:
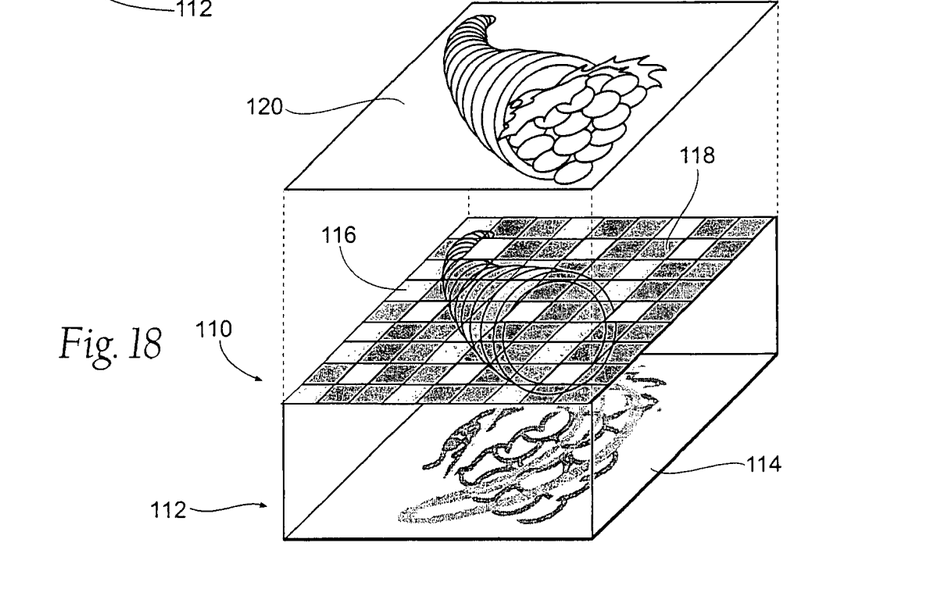
FIG. 18 is a further view of the substrate of FIG. 17 showing a perceived picture.

FIGS. 17 and 18 show a diagrammatic arrangement of a matrical image using a lensless process. A matrical image 110 comprising a composite image 112, as previously discussed with respect to the matrical process using lenses (see FIGS. 5-7), a clear substrate 114, and an alpha matrix 116 is depicted. The composite image 112 will be printed on the back surface of the clear substrate 114, opposite the side where the alpha matrix 116 and the alpha matrix image 118 are printed on the clear substrate 114. The alpha matrix image 116 further comprises a surface image 118. Under normal lighting conditions, the alpha matrix image 118 will be the only image that is viewed. As previously discussed with respect to FIGS. 2-7, the alpha matrix 116 allows a viewer to look through the alpha matrix 116 at the composite image 12 from multiple angles. In the lensless image, this will be accomplished by shining a backlight of the appropriate wavelength through the matrical image 110. The result is an image 120, as shown in FIG. 18, which combines the composite image 112 with the alpha matrix image 118. The images 112 and 118 may be designed and arranged in any appropriate way so that the composite image may appear to be in front, behind, or at the same depth as the alpha matrix image.

The alpha matrix 116 is shown having different sections with different levels of shading. This is done to exemplify the different tonal values of the matrical image 110. As was discussed previously, an alpha matrix will be designed and then reconfigured for each individual image, in any of the manners previously discussed or in any similar manners. The alpha matrix 116 is merely exemplary.

Lensless matrical imaging is an improvement over a wide range of multidimensional imaging processes. For instance, the present invention is an improvement over barrier strip imaging. Though barrier strip imaging may have some perceived 3-D and/or motion qualities, it is generally limited to viewing images using transmissive light processes. Matrical imaging allows viewing of images having both transmissive and reflective qualities. Generally, the front surface of a base material or substrate will be printed with a 2-D image of the alpha matrix, which allows the viewer to see through to the reverse side of the surface, which is imprinted with a matrical image. This is accomplished without the use of a lens substrate. Digital presses, such as an HP Indigo Digital Press, may be utilized for such matrical imaging processes. It should be noted that digital presses may also be employed for matrical processes that incorporate lenses.

The resulting images provide an embedded multi-dimensional image located within the front surface alpha matrix image. The embedded image may be printed with special ink, such as invisible ink, so the image is only visible when lit by the light of the appropriate wavelength. Still, the multi-dimensional image may be viewed within the matrical image at the same time as the surface image, and may be designed without the necessity of using lenses to produce the multi-dimensional image. The multi-dimensional image can have the appearance of being in front, behind, or integral with the front surface alpha matrix image. Previously, barrier strip images used opaque blocking strips to see a backing picture. The present invention lets a person essentially see a reflective surface alpha matrix image and through to view the matrical image.

The present invention could be employed in a wide range of technologies and industries, such as, but not limited to, security practices, passports, currency automotive digital displays, point-of-purchase displays, packaging, and publishing. For instance, the present image may be used to place hidden security pictures and the like within credit cards or currency that currently has been an arduous task. The images produced by the present invention would be difficult to reproduce, which would lead to an increase in security measures. Matrical imaging could also be used for currency security. Presently, United States currency uses watermarks as a safety feature. Matrical imaging could be used to provide an embedded image in the money that may only be viewed when held up to a light. The image would be much more difficult to copy, because the embedded image would be a completely separate image than what is viewed on the front of the currency.

Another example of where lensless matrical imaging may be utilized is with dashboard displays in vehicles. Currently, when the vehicle is operated and a backlight shines through the instrument panel, the graphics of the instrument panel has a relatively flat view. Matrical imaging would improve the images viewed by allowing a matrical image to be viewed through the front panel. When an alpha matrix of a matrical image is viewed with backlighting, the instrument panel can appear to take on 3-D or multi-dimensional qualities improving the visual impact of the graphics while providing for a more aesthetically pleasing view.

Figure 16:
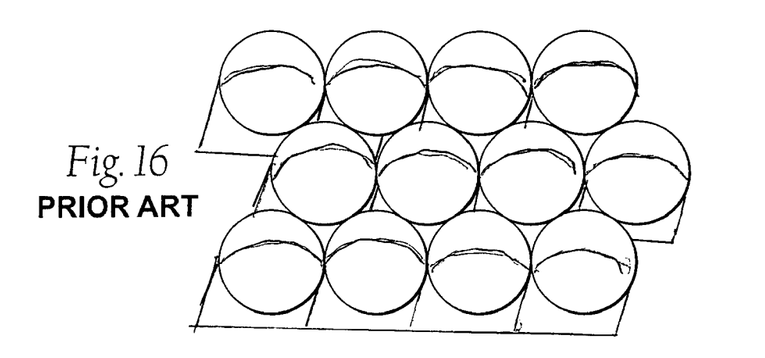
FIG. 16 is a lens arrangement according to the prior art.

It is advantageous to have a lens or lenses used in a multi-dimensional imaging process cover the entire image. FIG. 16 shows one array of lens used in the prior art, a "fly eye" lens. The fly eye lenses will be arranged to cover an entire image. However, there are still gaps between the lenses, which form non-optical areas. The non-optical areas prevent an image from displaying the full effects of the imaging process.

FIG. 12 shows a perspective view of a matrical lens array according to the present invention having a hexagonal shape. The lenses contiguously border each other, with no non-optical gaps between the lenses. Non-optical areas should be considered areas where the full potential of the visual effects is not perceived. The hexagonal or honeycombed lens arrangement is an efficient tessellated arrangement in that it allows lenses to be more efficiently arranged within the same area as other lens arrangements, such as square or rectangular lens arrays. The hexagonal lens has a greater ratio of lens surface area to lens perimeter than other arrangements. However, as previously discussed, a matrical lens may be designed using several shapes. Regardless of the shape of the lens array, matrical lenses will form an array of lenses that maximize the optical surface area without having non-optical areas, thereby achieving a more acute and efficient optical view than previous lens arrangements.

Figure 19:
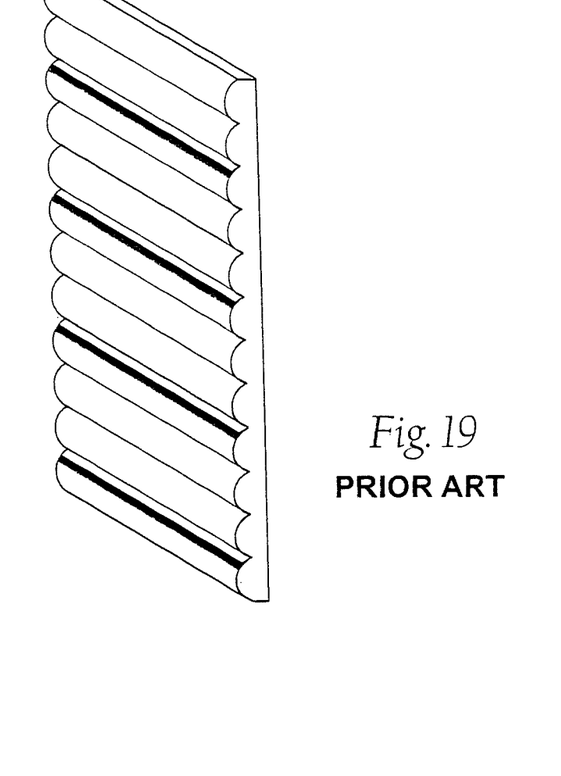
FIG. 19 is a perspective view of a lens array according to the prior art displaying an interference pattern.

FIG. 19 provides a schematic of a lenticular lens and image according to prior art. As previously noted, if the resolution does not correspond perfectly for a lens, there will be banding, glitches, lines, or artifacts located across the lenses, depicted in FIG. 19 as black lines, which are repetitive. While imaging at the precise lens resolution that coincides with the precise device resolution will remove banding from an image, equipment, software, time and money constraints may limit the ability to completely remove banding, especially when working at higher resolutions.

Figure 20:
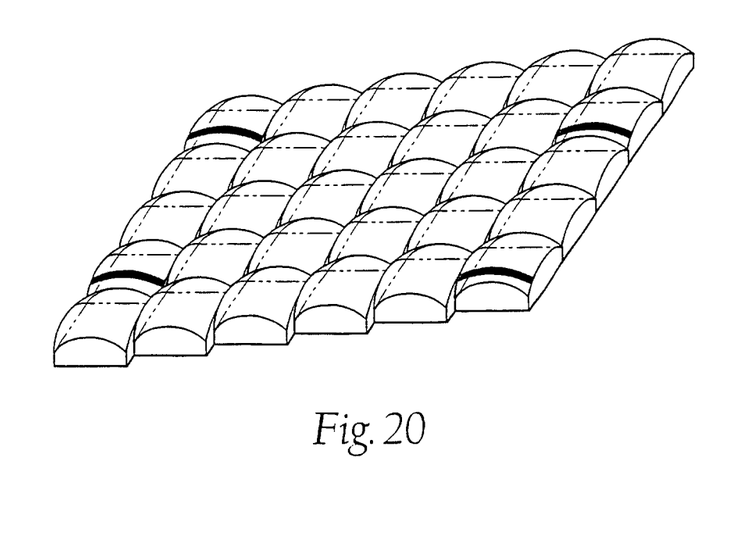
FIG. 20 is a planar view of a lens array according to the present invention displaying a minimized interference pattern.

FIG. 20 portrays a schematic of a matrical image according to the present invention. Banding may still arise in the lenses. However, since the lenses do not necessarily span the entire length or width of the image, the lenses may be shifted so that each of the individual lenses would be out of phase. Both the lenses and the matrical array may be shifted. The banding across an individual lens will not necessarily align with the banding across a neighboring lens, avoiding artifacts that would be visible across an entire image. By shifting and realigning the lenses and the array, the effects of banding will be less noticeable. As shown in FIG. 20, the lenses are phase-shifted ⅕ (20%) with respect to one another. Each fifth lens will be aligned with one another. The band that crossed the entire image in FIG. 20 will now be viewed in only every fifth lens. With proper orientation, banding effects will not be noticeable at all. This is achieved without degradation of neighboring or juxtaposed image frames, as was previously discussed with respect to lenticular imaging.

The present invention is beneficial over the prior art. Besides matrical images and matrical imaging providing multiple special effects within a single image previously not attainable with prior art images and processes, such as lenticular images and lenticular imaging, the present invention also improves the process of producing previous imaging styles. For instance, the lenticular imaging process requires lenticular lenses; the present invention could be used to produces the same product without using a lens. Thus, the present invention provides a new multi-dimensional process and apparatus, and also may be used to improve the existing prior art.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A method of producing a multidimensional image comprising the steps of:
    providing a plurality of planar image frames;
    ordering the planar image frames into a matrical frame set to form a matrical sequence;
    selecting a matrical lens;
    designing an alpha matrix that corresponds to the matrical sequence and the matrical lens;
    applying the alpha matrix to the matrical frame set; and
    forming a composite matrical image file from the matrical frame set; and
    outputting the composite matrical image file to form a matrical image, said matrical image being capable of tangential viewing of said planar images when viewing said matrical image through said matrical lens.

2. The method of claim 1 wherein the step of outputting the composite matrical image file further comprises printing the matrical image.

3. The method of claim 2 wherein the step of printing is carried out with a digital printing plate or digital printing press.

4. The method of claim 1 wherein the step of ordering the planar images further comprises layering the planar images.

5. The method of claim 1 wherein the step of designing an alpha matrix is performed before the step of selecting a matrical lens.

6. The method according to claim 1 wherein the planar image frames are digital image frames.

7. The method according to claim 1 further comprising the step of saving the composite matrical image file.

8. The method according to claim 1 wherein the step of selecting a matrical lens comprises selecting a plurality of matrical lenses, said method further comprising the step of arranging the matrical lenses in a tessellated fashion.

9. The method according to claim 8 wherein the matrical lenses have a hexagonal shape.

10. The method according to claim 1 wherein the step of designing an alpha matrix comprises designing an individual alpha matrix for each of the planar image frames.

11. The method according to claim 1 wherein the step of designing an alpha matrix comprises:
    designing a single alpha matrix; and
    correlating the single alpha matrix to each of the planar images.

12. The method according to claim 1 wherein the step of designing an alpha matrix comprises:
    designing a single alpha matrix; and
    manipulating the alpha matrix to correspond to each of the planar images through computer means.

13. A method of producing a multidimensional image comprising the steps of:
    providing a plurality of planar image frames;
    designing an alpha matrix;
    applying the alpha matrix to a surface image to form an alpha matrix image;
    ordering the planar image frames into a matrical frame set to form a matrical sequence;
    applying the alpha matrix image to a front surface of a clear substrate;
    forming a composite matrical image from the matrical frame set; and
    printing the composite matrical image on the clear substrate on the surface of the substrate opposite of the front surface.

14. The method of claim 13 wherein the step of printing is carried out with a digital printing plate or digital printing press.

15. A method of producing a multidimensional image comprising the steps of:
    providing an alpha matrix image;
    providing a clear substrate having a first side and a second side;

adhering said alpha matrix image to said first side of said clear substrate;
providing a matrical image; and
adhering said matrical image to said clear substrate on said second side of said clear substrate.

16. A method of producing a multidimensional image comprising the steps of:
provㅁiding a plurality of planar image frames;
ordering the planar image frames into a matrical frame set to form a matrical sequence;
selecting a matrical lens;
designing an alpha matrix that corresponds to the matrical sequence and the matrical lens;
applying the alpha matrix to the matrical frame set; and
outputting the matrical frame set to form a matrical image, said matrical image being capable of tangential viewing of said planar images when viewing said matrical image through said matrical lens.

\* \* \* \* \*